United States Patent Office 3,538,784
Patented Nov. 10, 1970

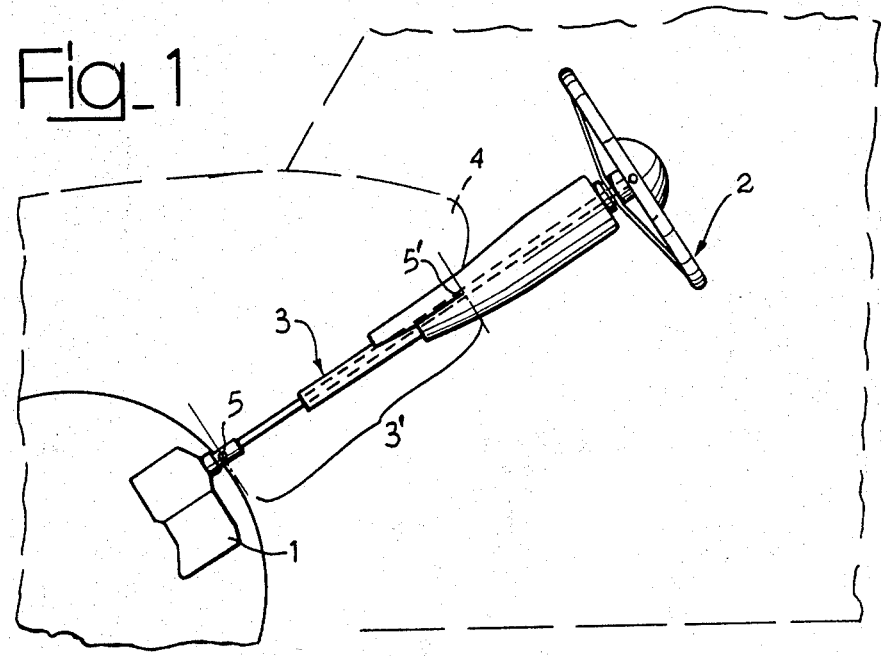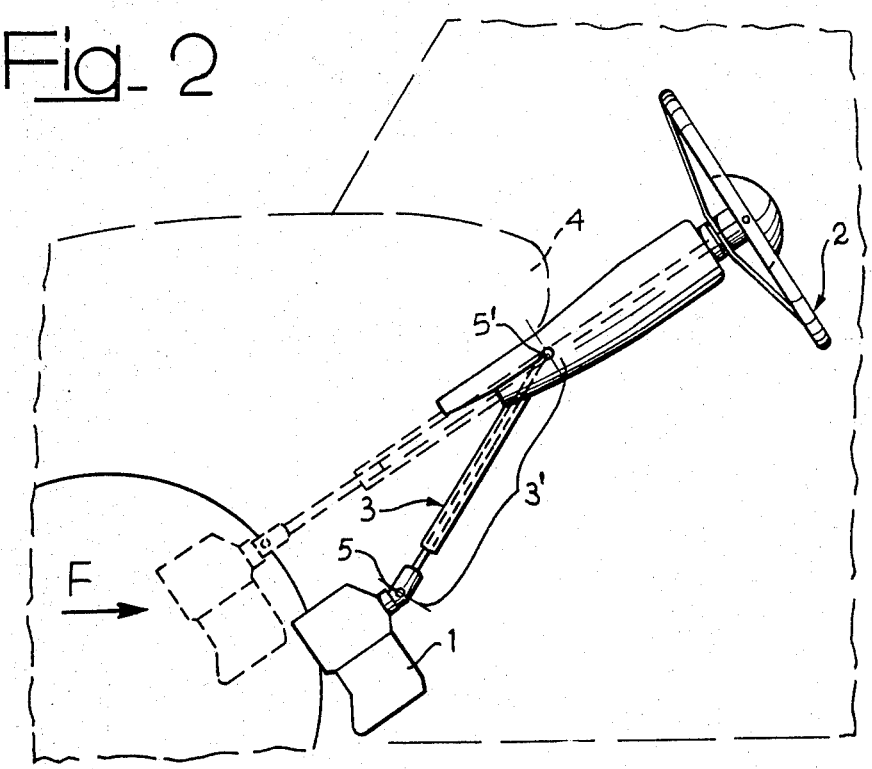

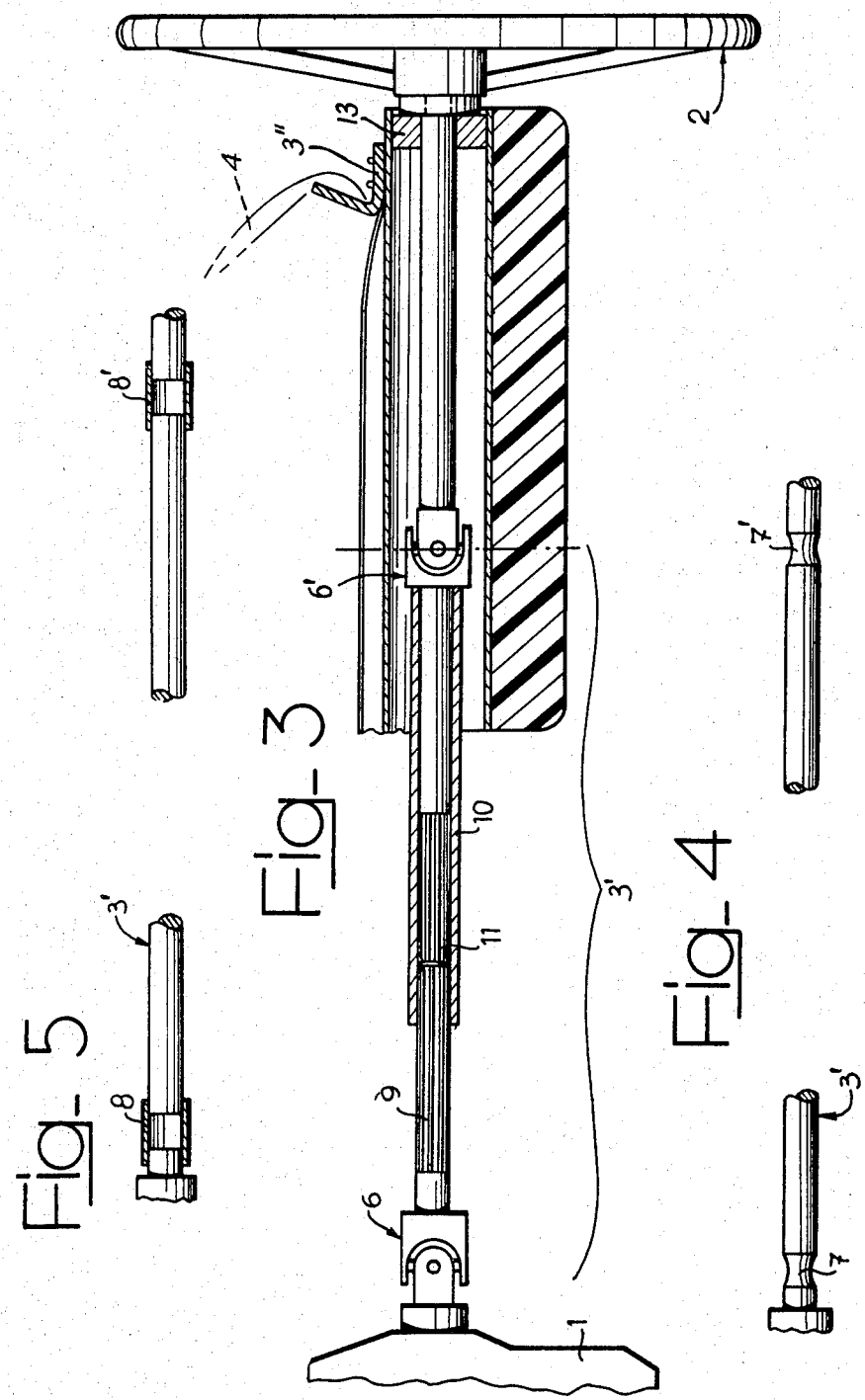

1

3,538,784
STEERING GEAR FOR MOTOR VEHICLES
Enzo Franchini, Turin, Italy, assignor to Fiat Societa per Azioni, Turin, Italy, an Italian joint-stock company
Filed Aug. 27, 1968, Ser. No. 755,571
Claims priority, application Italy, Sept. 5, 1967, 52,924/67
Int. Cl. B62d 1/18
U.S. Cl. 74—492                    2 Claims

ABSTRACT OF THE DISCLOSURE

A safety steering gear has a steering shaft with an axially collapsible portion between the steering box and the vehicle mounting point (e.g. the instrument panel). Yieldable joints, for example universal joints or weakened shaft regions, are provided at opposite ends of said collapsible portion, so that rearward displacement of the steering box upon frontal impact can occur without the transmission of the impact force to the steering wheel along the shaft.

---

This invention relates to steering gear for motor vehicles.

Conventional steering gear comprises a steering box operating the steerable wheels of the vehicle and a steering wheel connected with the steering box by way of a shaft which is generally inclined to the horizontal. Guide means are provided for guiding and supporting the shaft, the means usually comprising a tubular sheath which encloses at least part of the shaft and which is secured to a part of the vehicle body, for example, the instrument board.

It is known that upon frontal impact conditions the driver of a vehicle is often injured by the effect of forces transmitted from the forward end of the vehicle to the passenger compartment. Frontal impact usually causes shortening of the vehicle hood, as a result of which the steering box is displaced rearwardly relative to the vehicle body, forcing the steering shaft against the driver's chest and causing injuries which are often fatal. The effect is accentuated by the inertia of the driver, inasmuch as the driver's body is thrust forwardly upon impact, thereby increasing the force with which the driver is thrust against the hub of the steering wheel.

An object of the present invention is to obviate the above drawbacks by providing a steering gear which is safer than the conventional gear described above, and which reduces injuries to the driver in the case of a frontal impact by preventing the transmission of stresses, due to rearward displacement of the steering box, to the steering wheel and thence to the driver's body.

A further object of the invention is to provide a steering gear of the abovementioned improved type, which is simple and tough in construction, easily installed and convenient in use.

The main characteristic feature of the steering gear according to the invention is that the portion of the steering shaft between the steering box and mounted means connecting the shaft to the vehicle body is made deformable through the provision of two axially spaced-apart yieldable joints in said shaft portion, means being provided for permitting reduction in length of the said shaft portion under front impact conditions.

The invention will be more clearly understood from the following detailed description, given by way of example only, with reference to the accompanying drawings, wherein:

FIG. 1 is a diagrammatic side elevational view of a steering gear for motor vehicles according to the invention under normal operative conditions;

2

FIG. 2 is a diagrammatic side elevational view of the steering gear of FIG. 1 after the occurrence of a frontal impact;

FIG. 3 is a diagrammatic axial sectional view on an enlarged scale of the steering gear, according to one embodiment of the invention, and FIGS. 4 and 5 are respective diagrammatic partial side views, FIG. 5 being partly in section, showing respective modifications of the embodiment of FIG. 3.

Referring to FIG. 1, the steering gear shown includes a steering box 1 which is adapted to swing the steerable wheels (not shown) of a vehicle in response to rotation of a steering wheel 2 which is drivingly connected to the steering box 1 through a steering shaft denoted generally by 3. The shaft 3 which is, as shown, normally arranged with its axis inclined to the horizontal, has at least its upper part enclosed by a fixed tubular sheath which guides and supports the steering shaft 3 in a bearing 13 which is itself supported from the vehicle body, specifically the instrument board 4, for example by a bracket 3″ (FIG. 3).

Frontal collision or impact subjects the steering box 1 to a force F directed rearwardly, that is, towards the inside of the vehicle passenger compartment, causing rearward displacement of the steering box 1. Corresponding rearward displacement of the shaft 3 is prevented by making the forward portion 3′ of the shaft included between the steering box 1 and instrument board 4 deformable and axially collapsible. This is achieved according to the invention by providing two axially spaced-apart yieldable joints 5, 5′ at opposite respective ends of the forward shaft portion 3′.

The deformability of the forward portion 3′ of the shaft may be obtained in various ways: FIGS. 3, 4 and 5 show three different embodiments. In the embodiment shown in FIG. 3 the forward shaft portion 3′ is provided at its opposite ends with respective universal or cardan joints 6, 6′ by which torque can be transmitted from the steering wheel 2 to the steering box 1, while permitting the said forward shaft portion 3′ to take any inclination with respect to the fixed rear shaft portion. According to the modifications shown in FIGS. 4 and 5, the yieldable joints are obtained by locally reducing the resistance to bending of the shaft, such as by providing two regions 7, 7′ of reduced cross-section at the opposite ends of the portion 3′, as shown in FIG. 4, or by connecting the forward shaft portion 3′ to the steering box 1 and rearward shaft portion by respective sleeves 8, 8′ which are collapsible on a shock, as shown in FIG. 5.

In order to permit reduction in the length of the forward shaft portion 3′, a splined coupling is adopted, comprising a cylindrical or prismatic section externally splined member 9 slidably mounted in an internally splined end 11 of a tubular member 10.

Upon frontal collision or impact, the steering box 1 can be displaced rearwardly with respect to the vehicle passenger compartment, causing an angular displacement of the forward shaft portion 3′ and a reduction of the length thereof. As a result, axial stresses deriving from the impact are prevented from being transmitted to the steering wheel 2.

I claim:
1. A steering assembly for motor vehicles, comprising: (a) a steering box, (b) a shaft connected to the steering box, (c) a steering wheel mounted at the end of the shaft remote from the steering box, (d) mounting means secured to the vehicle body and supporting the shaft adjacent the steering wheel for rotation about its axis, (e) two axially spaced-apart regions of the shaft of relatively reduced cross-section at opposite ends of the portion of the shaft between the steering box and the mounting means, and (f) telescopic means in said portion of the shaft permitting reduction in the length of said portion, reward displacement of the steering box relative to the mounting means being permitted under frontal impact conditions.

2. A steering assembly for motor vehicles, comprising: (a) a steering box, (b) a shaft connected to the steering box, (c) a steering wheel mounted at the end of the shaft remote from the steering box, (d) mounting means secured to the vehicle body and supporting the shaft adjacent the steering wheel for rotation about its axis, (e) two axially spaced-apart yieldable joints at opposite ends of the portion of the shaft between the steering box and the mounting means, said joints comprising respective deformable sleeves surrounding the respective ends of the said shaft portion, and (f) telescopic means in said portion of the shaft permitting reduction in the length of said portion, rearward displacement of the steering box relative to the mounting means being permitted under frontal impact conditions.

References Cited

UNITED STATES PATENTS

| 1,458,894 | 6/1923 | Schwarz | 64—11 |
| 2,548,244 | 4/1951 | Stein | 74—492 |
| 2,801,702 | 8/1957 | Armington | 180—43 |
| 2,865,222 | 12/1958 | Bachman | 74—493 |

OTHER REFERENCES

German printed application, 1,134,299, Aug. 7, 1962, Richter et al.

MILTON KAUFMAN, Primary Examiner